United States Patent

[11] 3,536,210

| [72] | Inventor | John Edward Dickinson<br>Malton, England |
| --- | --- | --- |
| [21] | Appl. No. | 803,746 |
| [22] | Filed | March 3, 1969 |
| [45] | Patented | Oct. 27, 1970 |
| [73] | Assignee | Boythorpe Cropstores Limited<br>Weaverthorpe, Malton, England |
| [32] | Priority | March 5, 1968 |
| [33] | | Great Britain |
| [31] | | 10,520/68 |

[54] UNLOADING MEANS FOR STORAGE SILOS
7 Claims, 5 Drawing Figs.

[52] U.S. Cl. .................................................. 214/17
[51] Int. Cl. ............................................. B65g 65/46
[50] Field of Search ......................................... 214/17.82

[56] References Cited
UNITED STATES PATENTS

| 2,914,198 | 11/1959 | Hein ........................... | 214/17 |
| 3,088,606 | 5/1963 | Schaefer ..................... | 214/17 |
| 3,127,032 | 3/1964 | Roberts ...................... | 214/17 |
| 3,151,749 | 10/1964 | Long ........................... | 214/17 |

Primary Examiner—Robert G. Sheridan
Attorney—Scrivener, Parker, Scrivener and Clarke ABSTRACT: This invention concerns storage silos and in particular relates to an auger discharge system therefor including a discharge auger for mounting material from the central region of the silo and a sweep auger which is rotatable about a vertical axis at the centre of the silo to assist in the discharge of bulk material such as grain stored therein.

Patented Oct. 27, 1970　3,536,210

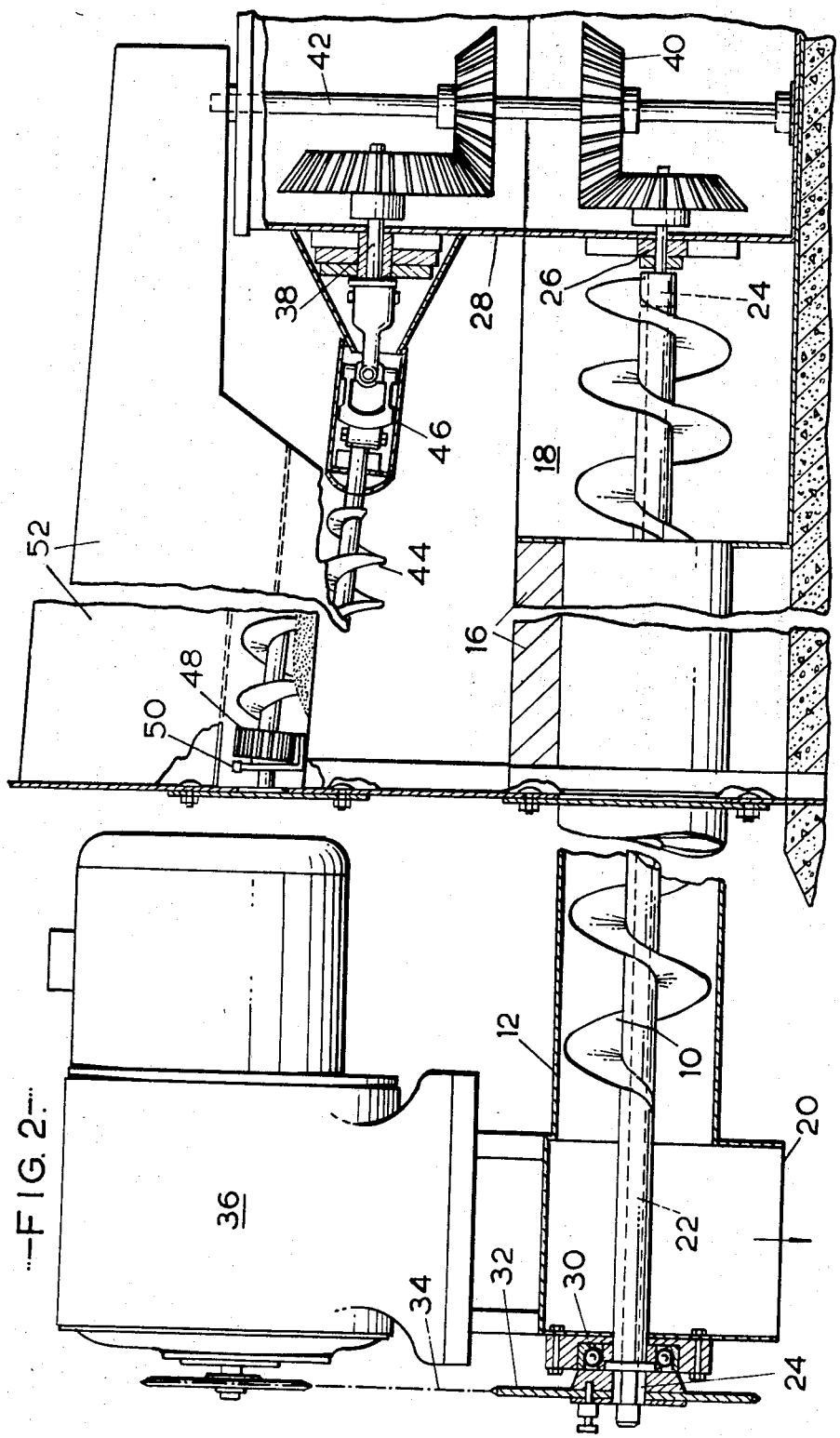

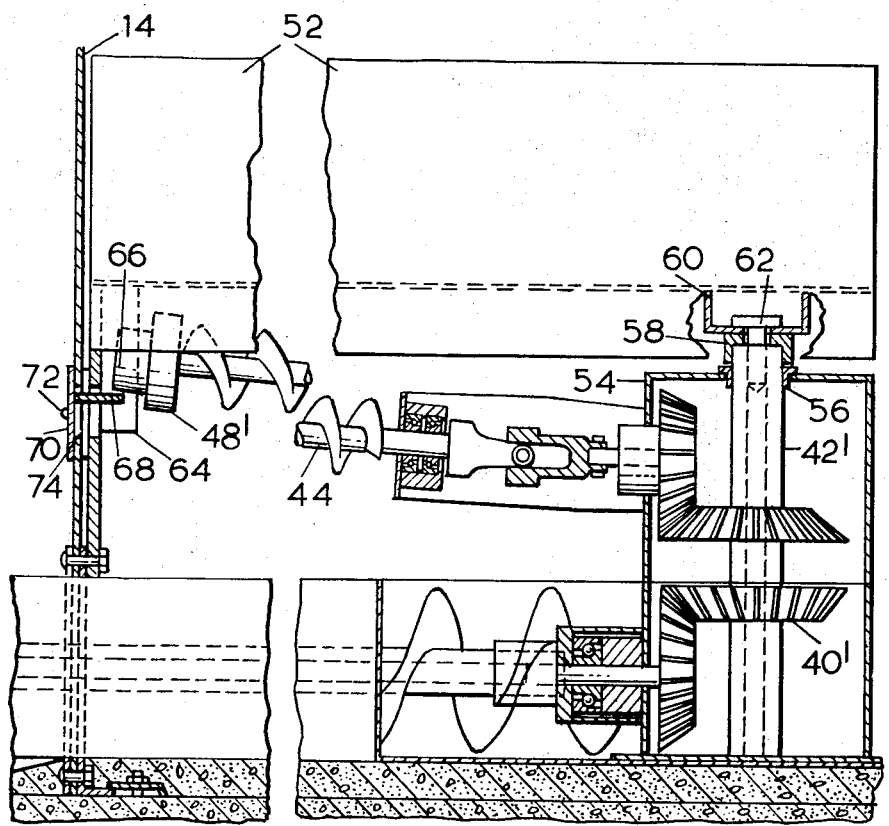
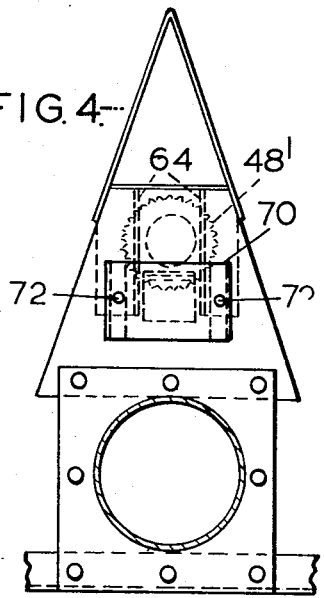
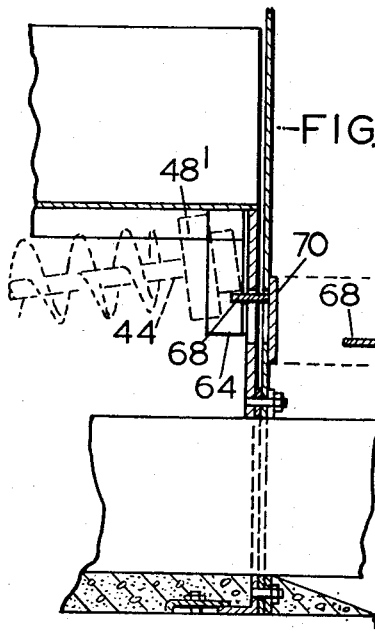

UNLOADING MEANS FOR STORAGE SILOS

It is a primary object of the invention to provide a sweep auger for a silo having a central drive assembly for the sweep auger.

It is another object of the invention to provide a sweep auger in which the drive for the sweep auger is separate from the drive for the main discharge auger.

It is a further object of the invention to provide protection in the form of a shield for the sweep auger when in its rest position, to protect it from the load of bulk material, wherein the shield does not interfere with the rotation of the sweep auger and does not require to be removed to permit this rotation.

It is a still further object to provide a central support for the shield.

It is a still further object to allow for operation of the sweep auger in its rest position without rotation around the silo.

According to the present invention in an auger discharge system for silos comprising a discharge auger for removing bulk material from the central region of a silo and a sweep auger which is rotatable about a vertical axis at the centre of the silo, the discharge auger is hollow and a rotatable shaft extends concentrically through the hollow discharge auger to transmit drive for the sweep auger from outside the silo to the said central region thereof. Drive may be transmitted between the inner end of the shaft and the sweep auger by a gear box.

Preferably a shield is provided which extends from said central region of the silo to the silo wall under which the sweep auger can pass when rotating around the silo and under which it can be positioned during loading and storage of the bulk material. The shield has been found necessary to facilitate starting the sweep auger.

Preferably removable support means are provided on or adjacent the silo wall under the shield to receive the end of the sweep auger and permit the latter to rotate about its axis whilst preventing circulation of the auger.

Preferably a central support is provided for the inner end of the shield. Conveniently this is provided at the upper end of a central stationary shaft of the gear box.

The invention will now be described by way of example with reference to the accompanying drawing in which:

FIG. 2 is a side view of the auger system of FIG. 1 with the sweep auger in its rest position beneath the shield, parts of the system being broken away or shown in section, to reveal detail;

FIG. 3 is a side view similar to FIG. 2 and illustrates a central mounting for the shield and an alternative support for the free end of the sweep auger;

FIG. 4 is an end view of the shield with part of the silo wall removed; and

FIG. 5 is a side view of the end of the shield with the alternative support for the sweep auger.

Figure 1:
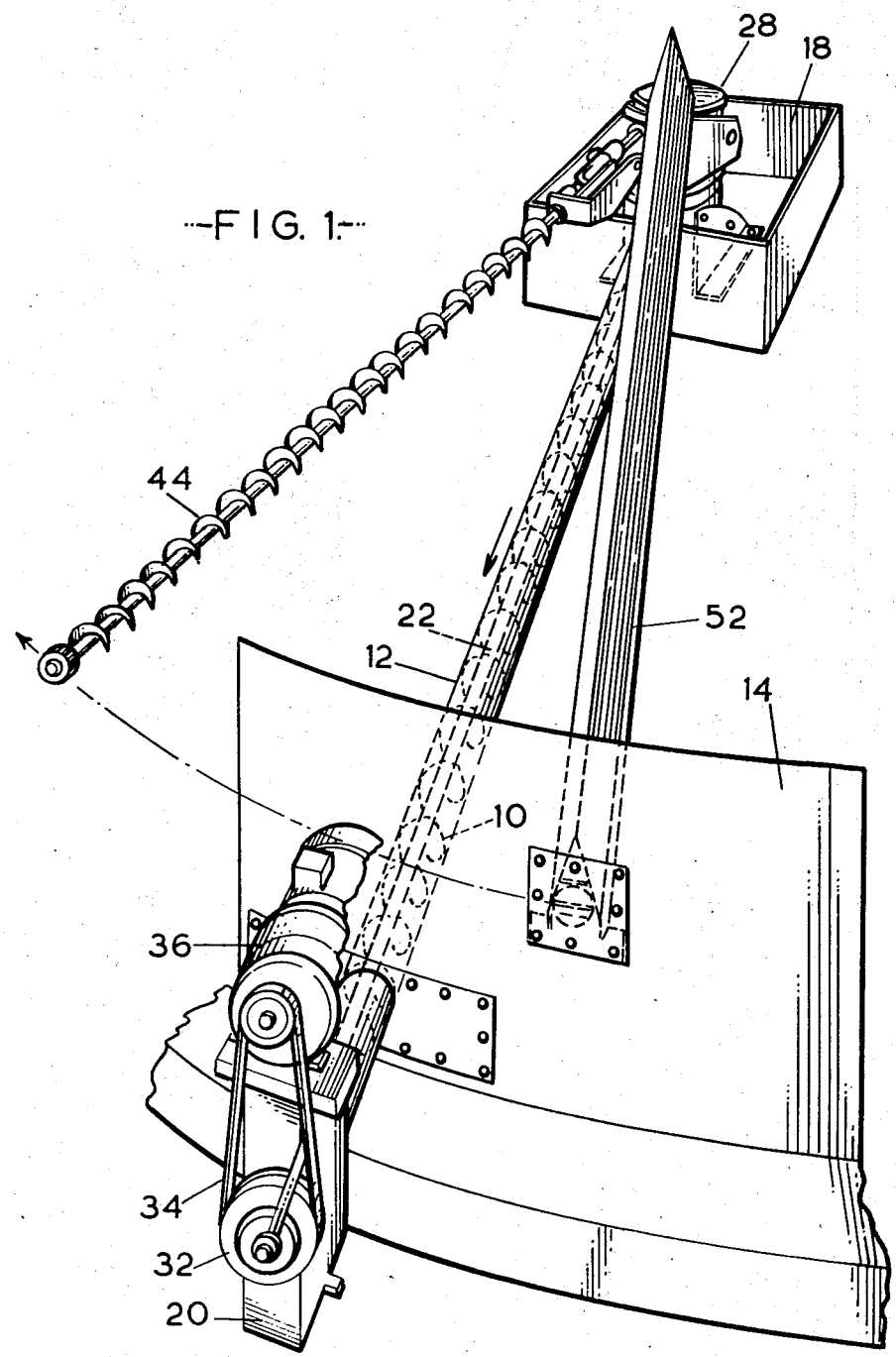
FIG. 1 is a perspective view of an auger system and shield embodying the invention for use in a circular silo only part of which is shown, for clarity.

In brief the auger system illustrated in FIGS. 1 and 2 comprises an enclosed discharge auger which extends from the centre of the silo through the silo wall to a delivery port and a sweep auger mounted for rotation about a vertical axis at the centre of the silo. The sweep auger is brought into operation after a proportion of the bulk material has been withdrawn from the silo to draw the bulk material from the sides of the silo to the centre where it is picked up by the discharge auger. Drive for the sweep auger is carried to the centre of the silo through the hollow interior of the discharge auger and a shield is provided between the centre and the side wall of the silo under which the sweep auger can pass and be stored in its rest position.

Referring now to the drawings, a discharge auger 10 enclosed within a tube 12 extends between the centre of a silo 14 (only a portion of the silo wall being shown in the drawing) beneath the floor of the silo 16. The inner end of the discharge auger 10 communicates with a well 18 in the floor 16 and at its other communicates with a delivery port 20 from which the bulk material is discharged during operation. The centre of the discharge auger 10 is hollow and forms a sleeve 21 through which a shaft 22 passes. The shaft 22 is carried concentrically in the sleeve by nylon bearings 24 which do not require lubrication which could cause contamination of the stored material.

The shaft 22 protrudes beyond the two ends of the sleeve 21 at the inner end of the auger 10, the shaft 22 passes through a bearing 26 into a gear box 28.

At the outer end of the auger 10, the sleeve passes through a bearing assembly 30 and carries a pulley or sprocket wheel 32 driven by a belt or chain 34 from a motor 36 mounted on the protruding auger housing 16.

A clutch is provided between the pulley 32 and the shaft 22 so that the discharge auger 10 can be operated without drive being transmitted to the gear box 28.

The gear box 28 includes an output shaft 38, drive being transmitted via the gear train 40 between the shaft 26 and the output shaft 38. The output shaft 38 extends from an upper section of the gear box which is rotatable relative to the lower section about the axis of the vertical gear box shaft 42. The output shaft 38 is connected to a sweep auger 44 through a universal coupling 46 which permits rotation of the auger when inclined to the output shaft. The remote end of the auger 44 carries a toothed wheel 48, which, when the auger 44 is in an operative position, causes the auger to progress in a circular path around the silo.

The direction of rotation of the two augers 10 and 44 are chosen so that material is drawn towards the centre by the sweep auger 44 and conveyed away from the centre by the discharge auger 10.

During loading and storage of the material, the sweep auger 44 is held in an inoperative position (shown in FIG. 2) with the wheel 48 resting in a cupped bracket 50. The bracket is movable from outside the silo to permit the auger to drop from its raised position. Although not shown it is envisaged that the bracket may be slidable in a vertical guide so that, with the auger 44 rotating it can be lowered slowly. At the same time, the cup shaped bracket would require to be cut-away or would include a movable locking plate or the like, to permit the wheel to rotate out of the bracket when the auger 44 reached the desired lower position.

A shield or cover 52 of inverted V cross section extends between the centre of the silo and terminates at the silo wall immediately above the bracket 50. When not in use, the sweep auger 44 is housed under and in part within this cover which prevents the full weight of the bulk material above the auger from bearing on it while under the shield. This facilitates starting the sweep auger. It will be noted that by spacing the shield from the floor of the silo, the sweep auger can rotate without obstruction around the floor of the silo. Furthermore by stopping the sweep auger so as to register with the bracket 50, the auger can be once again lifted up under the shield 52, from outside the silo, should this become necessary.

It will be appreciated that the provision of the clutch at the external end of the discharge auger rather than in the gear box, obviates the requirement for a linkage which would otherwise be necessary between the gear box and the outside of the silo, by which to engage and disengage the drive to the sweep auger.

It will also be appreciated that since the sweep auger 44 can be operated whilst in one particular radial position viz. under the shield, the sweep auger can be operated as necessary during unloading of the silo to clear blockages of material caused by bridging.

Referring particularly to FIG. 1, it will be seen that the centrally mounted gear box 28 constitutes a convenient support for the inner end of the shield 52. Furthermore, it has been found that the inverted V section of the shield 52 gives the required strength to contain the downward force exerted by the material above the shield when the silo is full. Although a shield of, for example, inverted channel section would serve to cover the auger 44, the configuration of the channel section would not distribute the loading in the same way as the steep inclined sides of the V section shield 52. An inverted channel section shield could therefore collapse or bend under load.

FIG. 3 illustrates a modified gear box and housing, having a mounting for the inner end of the sweep auger shield 52. The central shaft 42' of the gear box is stationary and extends beyond the upper end of the gear box housing 54. A collar 56 surrounds the shaft 42' where it extends through the housing and a cup-like member 58 is inverted and fitted over the protruding end of the shaft with its lower periphery resting on the collar 56. A channel member 60 secured within the shield 52 and extending transversely thereacross rests on the upper end of the cup 58.

Both the channel member 60 and cup 58 include apertures which align with a threaded axial bore in the upper end of the shaft 42' through which a bolt 62 can be passed to engage in the hole and secure the channel to the shaft. Since the shaft 42' is stationary the intermediate transmission elements 40', 42' are mounted for rotation about the shaft.

As also shown in FIG. 3 but better illustrated in FIGS. 4 and 5, the outer end of the sweep auger 44 may be supported in a different manner from that illustrated in FIGS. 1 and 2. To this end, a vertical channel is formed by two plates 64 each of which is secured to the interior of the silo wall 14, within the triangular interior of the shield 52. The channel serves to accommodate a circular section boss 66 formed at the end of the sweep auger 44 (as shown in FIGS. 3 and 5). Between the boss 66 and the auger 44 there is a section of enlarged diameter 48' (corresponding to the wheel 48 in FIGS. 1 and 2).

In the position shown the boss 66 is supported on a plate 68 which extends perpendicularly from a cover plate 70 attached to the outer face of the silo wall 14 by bolts 72 (See FIG. 4) and serving to cover an aperture 74 in the silo wall 14. The plate 68 is disposed nearer one end of the plate 70 than the other and the latter can be fitted either as shown in FIGS. 3 and 4 or inverted as illustrated in FIG. 5, with the plate 68 below the level shown in FIGS. 3 and 4.

The auger 44 is normally supported beneath the shield 52 in the highest position —i.e., with the cover plate 70 in the position shown in FIGS. 3 and 4. As the silo is emptied the sweep auger can be operated for a time whilst in this first position. However to obtain maximum advantage of the "stationary" operation of the sweep auger, it may then be lowered by removing the cover plate 70 and inverting same so that the boss rests on the other side of the plate 68 which now occupies a lower position relative to the silo wall.

After operation of the sweep auger at this position, it may be dropped fully below the level of the shield 52 by removing the cover plate 70 altogether. This can be replaced as soon as the sweep auger has dropped clear and started to rotate around the silo.

I claim:

1. A silo and an auger discharge system therefor comprising a hollow discharge auger for removing the bulk material from the central region of the silo and a sweep auger which is rotatable about a vertical axis at the centre of the silo, a rotatable shaft extending concentrically through the hollow discharge auger, driving means outside said silo operatively connected to said shaft for rotating the same, a gear box at the centre of the silo drivingly connecting the inner end of said shaft with said sweep auger, and a shield extending from the centre of the silo to the silo wall and constructed and arranged with respect to the sweep auger that the latter can pass under said shield to rotate more than once around the silo, and means adapted to receive the free end of the auger and support the same while permitting the latter to rotate about its own axis while beneath the shield.

2. A silo as set forth in claim 1 in which said means adapted to receive the free end of the sweep auger is securable to the silo wall and is adjacent the shield and is at least in part removable to allow the free end of the sweep auger to drop so that the sweep auger is clear of the shield.

3. A silo as set forth in claim 1 further comprising a rotary drive source outside the silo for driving the discharge auger and clutch means by which said drive may be transmitted to the said rotatable shaft in the hollow interior of the discharge auger.

4. A silo as set forth in claim 1 further comprising support means for both outer and inner ends of the shield.

5. A silo as set forth in claim 4 wherein the inner end of the shield is supported by a stationary central vertical shaft of the gear box.

6. A silo as set forth in claim 2 wherein the removable support means comprises a plate member for covering an aperture in the silo wall and a second plate member upstanding therefrom to protrude through the aperture into the silo and form a platform when the first mentioned plate member is fitted in place.

7. A silo as set forth in claim 6 wherein the support means further comprises vertical guide means on either side of the platform between which the end of the sweep auger fits when supported on said platform and by which the end of the auger may be vertically guided to a position clear below said shield prior to rotation of said auger about said vertical axis.